Figure 8:
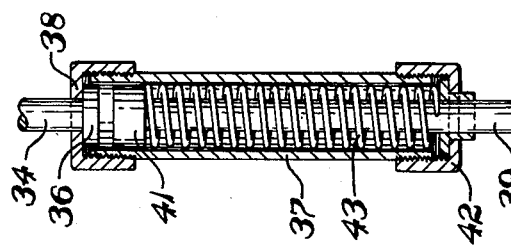

July 17, 1962 J. R. YOHO 3,044,534
APPARATUS FOR APPLYING FLEXIBLE STRIPS TO
THE EDGES OF A FLAT CONVEYOR BELT
Filed Oct. 27, 1958 4 Sheets-Sheet 1
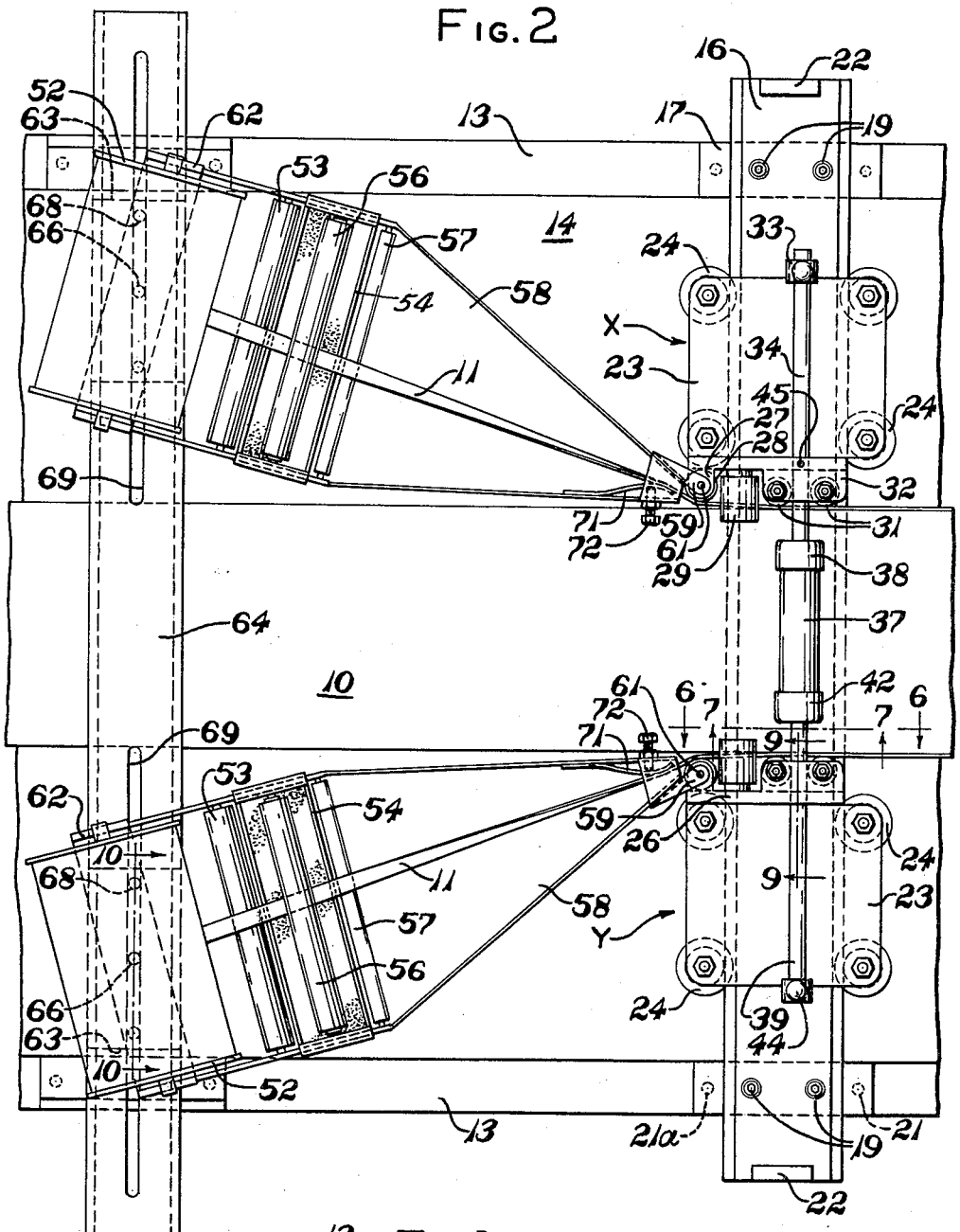
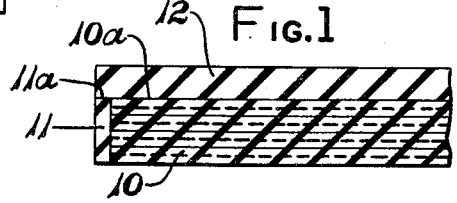
INVENTOR.
JOHN R. YOHO
BY
James R. Lindsay
ATTY.

July 17, 1962 J. R. YOHO 3,044,534
APPARATUS FOR APPLYING FLEXIBLE STRIPS TO
THE EDGES OF A FLAT CONVEYOR BELT
Filed Oct. 27, 1958 4 Sheets-Sheet 2

INVENTOR.
JOHN R. YOHO
BY James R. Lindsay
ATTY.

INVENTOR.
JOHN R. YOHO
BY
James R. Lindsay
ATTY.

INVENTOR.
JOHN R. YOHO

United States Patent Office 3,044,534
Patented July 17, 1962

3,044,534
APPARATUS FOR APPLYING FLEXIBLE STRIPS
TO THE EDGES OF A FLAT CONVEYOR BELT
John R. Yoho, Akron, Ohio, assignor to The B. F. Goodrich Company, New York, N.Y., a corporation of New York
Filed Oct. 27, 1958, Ser. No. 769,869
5 Claims. (Cl. 156—467)

This invention relates to apparatus for continuously applying a flexible bumper or edge strip of rubber or rubber-like material to one or to both edges of the carcass of a flat type conveyor belt.

Conveyor belts are formed of a number of plies of cord fabric coated with rubber or rubber-like material. The final step before curing the belt is that of placing a cover of rubber or rubber-like material over the plies of coated cord fabric. Since these belts are quite stiff laterally, they are not maintained in guides during fabrication. It has been customary to adhere a strip of rubber or rubber-like material against each edge of the belt carcass to protect the edges of the carcass during use of the belt and to seal the edges of the belt carcass so that foreign matter will not be able to work or wick into the belt carcass. The rubber belt cover is applied over the top surface of the belt after the edge strips have been adhered to the belt carcass.

Heretofore, the edge strips have been applied manually which required that the belt carcass be advanced intermittently. The apparatus of the invention will apply the edge strips whether the belt is advanced intermittently for step-by-step assembly or whether the belt carcass moves continuously.

During fabrication, the belt is advanced on smooth, flat tables (or rollers) and may shift laterally of its direction of motion along the support. It is a feature of this invention that the edge strip applying means are so arranged as to continuously press the edges of the belt even though lateral shifting of the belt may occur. In the preferred embodiment of the invention there is a cross-rail mounted above a belt support table. A pair of carriages can roll or slide along this cross-rail. These carriages embody pressing rollers that operate on the edge strip. The carriages are connected by a tie rod assembly that includes a spring so arranged that the carriages are urged toward one another, which action insures that there will be sidewise pressure applied to the edge strip along each edge of the belt.

This construction permits the carriages to follow and accommodate any lateral shifting of the belt proper that might occur, but does not interfere with the constant resilient pressing action exerted by the carriage-mounted rollers against the edge strip at the associated edges of the belt.

As a result of this combination of elements the edge strip can be applied automatically to heavy and rather stiff flat belts with the assurance that the edge strips will be properly adhered to the belt carcass.

The manner in which these advantages may be obtained will be apparent in the following detailed description of a preferred embodiment of the invention.

Figure 9:
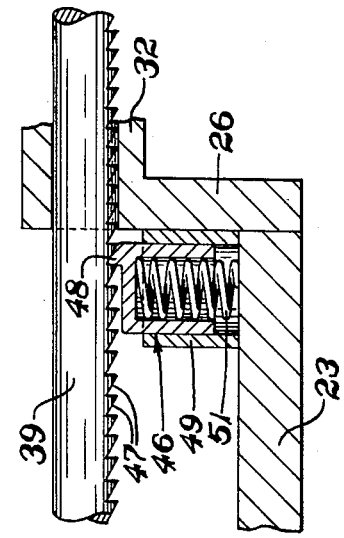
Figure 10:
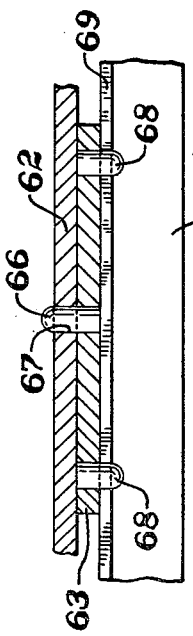
Figure 3:
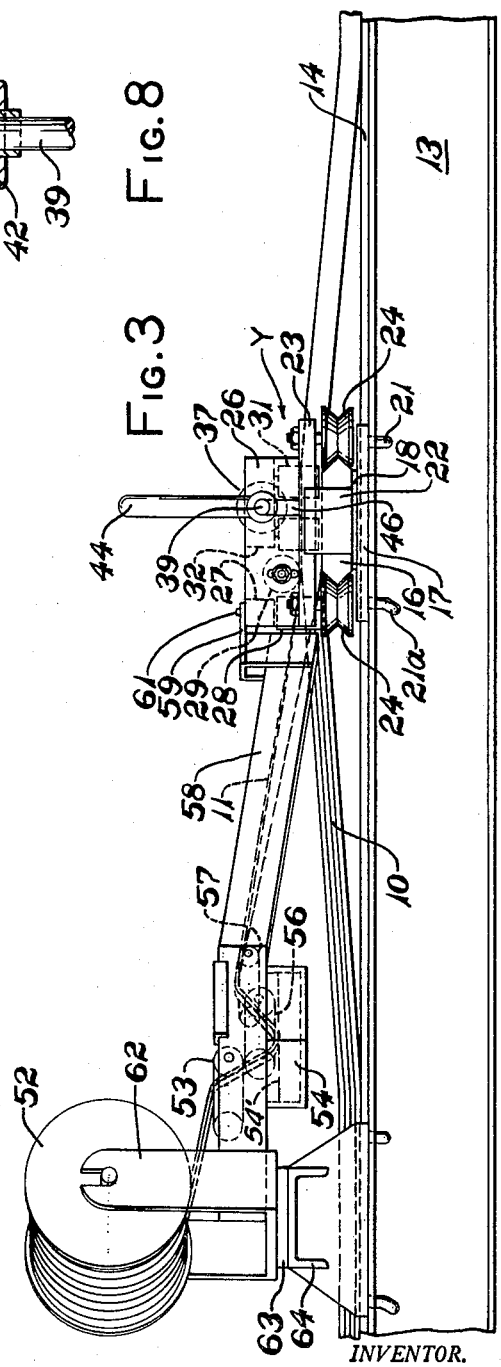
Figure 5:
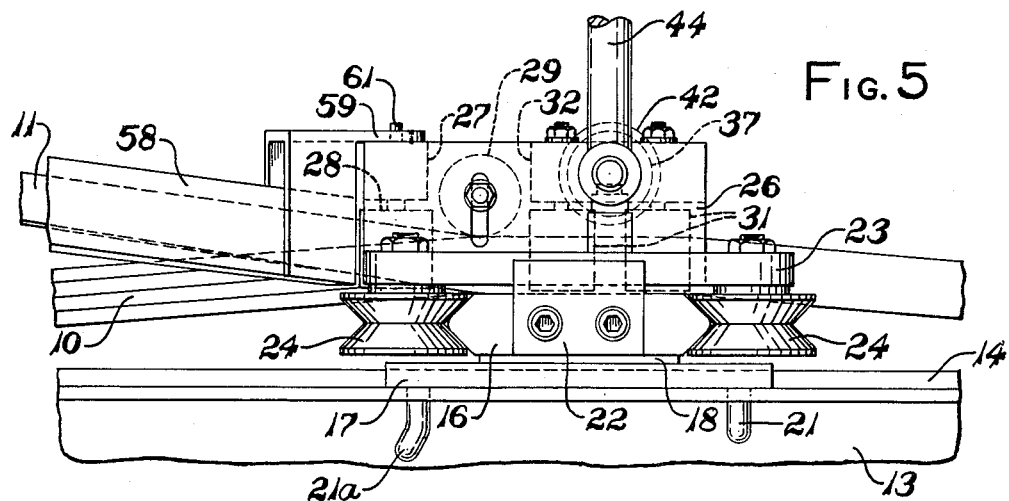
Figure 4:
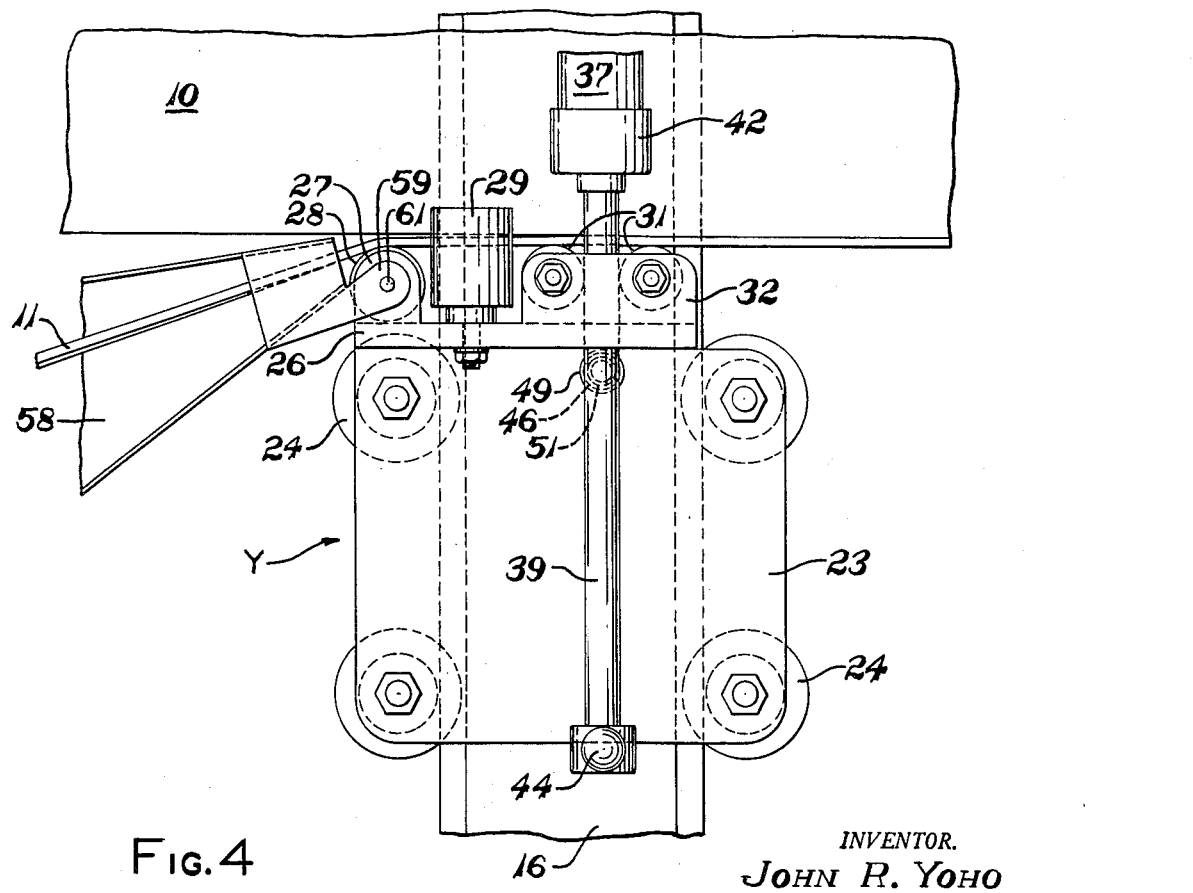
Figure 6:
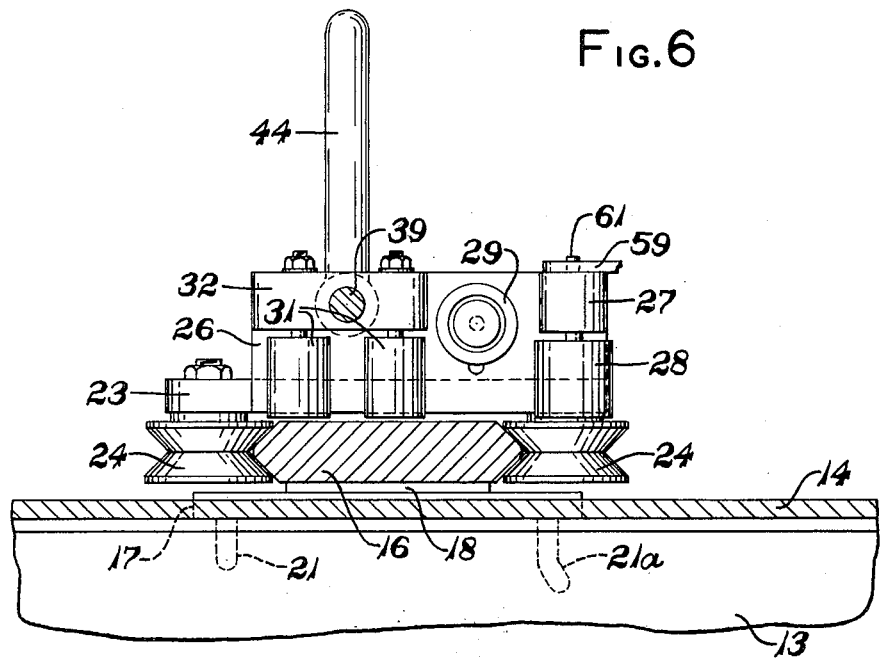
Figure 7:
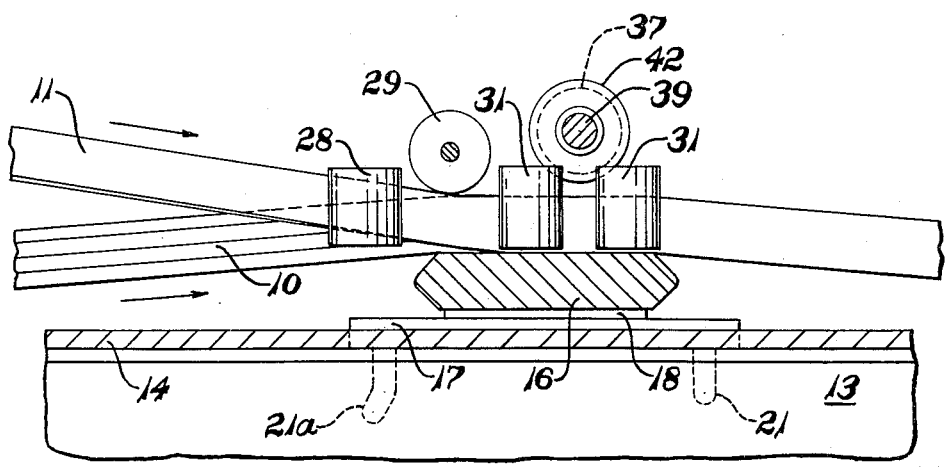

In the drawings:
FIG. 1 is a partial section of a belt;

FIG. 2 is a plan view of the apparatus forming a prefered embodiment of the invention;
FIG. 3 is a side view of the apparatus;
FIG. 4 is a plan view of one carriage assembly;
FIG. 5 is a side view of the assembly;
FIG. 6 is a section taken on 6—6 of FIG. 2 with the belt omitted;
FIG. 7 is a section taken on 7—7 of FIG. 2 with a belt included;
FIG. 8 is a partial section of the tensioning device;
FIG. 9 is a section taken on 9—9 of FIG. 2; and
FIG. 10 is a section taken on 10—10 of FIG. 2.

Referring to FIG. 1 the typical belt construction is shown in partial section. The belt B has a body or carcass 10 formed by laminating several plies of rubberized cord or fabric material together.

This invention relates to the application of edge strip 11 which protects the edge of the belt and carcass. After application of the edge strips to the belt carcass 10, the rubber cover 12 is applied along the upper surface 10a of the belt carcass 10, and over the upper edge 11a of the edge strip 11.

The prefered apparatus for applying the edge strips to the belt carcass includes a pair of flat channels 13 which support a table 14. Extending across the table is a guide rail 16 which is attached to a pair of mounting plates 17, there being a spacer 18 provided between the guide rail 16 and the mounting plates 17. Guide rail 16 and spacer 18 are secured to mounting plates 17 by bolts 19. Pins 21 and 21a extend downwardly from the mounting plates 17 and fit into apertures in the channels 13 to locate mounting plates 17 in proper position on channels 13. End stops 22 are fitted to the guide rail. A pair of carriages are arranged for movement along the guide rail 16. Each carriage includes a base plate 23 and mounts four rollers 24. The edges of the guide rail 16 are beveled and the rollers are contoured to complement the shape of the guide rail thereby providing vertical alignment.

Each carriage has an upright plate 26 which includes a boss 27 for mounting an edge strip guide roller 28. Also mounted on the upright plate is a surface roller 29. Each carriage has a pair of edge presser rollers 31 mounted on a boss 32.

Means are provided to urge the carriages toward one another in order to press the edge strip 11 against the edge of the belt carcass 10. To this end a tie rod bracket 33 mounts a tie rod member 34 which has a head or enlargment 36. This head is mounted on a tension tube 37 having a threaded end cap 38. A second tie rod member 39 extends into the tube 37 and is provided with a head 41. The other end of the tube is closed by an end cap 42. A tension spring 43 is compressed between the head 41 of tie rod 39 and end cap 42. A handle 44 is attached to the outer end of tie rod 39.

This assembly is arranged to define a desired tension on any belt that fits the apparatus. The basic width of the assembly is adjusted by moving the carriage X along the tie rod while the heads 41 and 36 are in contact to establish basic contact of rolls 31 of carriages X and Y with the edges of the belt. A pin 45 or the like will then lock carriage X to the tie rod 34. Means are provided for introducing the desired tension on the spring 43 to press the rollers 31 on each carriage against the edge strips being applied, which means are partially illustrated in FIG. 9. Here it can be seen that a latch member 46 of carriage Y is spring mounted to engage ratchet teeth 47 cut on the underside of tie rod member 39, the latch member having a tooth member 48 for engaging teeth 47. A spring housing 49 secured to base plate 23 of carriage Y houses latch spring 51 which urges tooth member 48 of latch member 46 into engagement with teeth 47 provided on tie rod member 39. Retraction of rod 39 by means of handle 44 will compress the spring 43 and urge carriages X and Y toward one another against the edges of the belt. The engagement of tooth member 48 of latch member 46 with teeth 47 on tie rod member 39 can be released when desired by rotating handle 44 to clear the teeth 47 on tie rod 39 from the latch member.

The means for feeding and supplying edge strip material properly coated with a cement will now be described. The edge strip material is wound on a spool 52 and is fed over a guide roller 53 positioned at a cement container 54. A guide roller 56 is positioned in the cement container and insures that the edge strip material will pass through the cement. The level of the cement in container 54 is indicated by the reference numeral 54' in FIG. 3. An outlet roller 57 guides the edge strip material out of the cement container. This entire assembly is mounted on a switching arm 58 which ends in a swivel plate 59 that pivots on a bolt 61 that mounts guide roller 28. Spool 52 is mounted on a yoke 62 which in turn is mounted on a slide plate 63. As best seen in FIGS. 3 and 10, there is a cross channel member 64, and pin 66 projects upwardly from slide plate 63 into a hole 67 formed in the base of spool mounting yoke 62. Pins 68 project downwardly from the slide plate 63 and ride in a slot 69 formed in cross channel 64 permitting the spool 52 to be shifted laterally of the apparatus. Slot 69 is best seen in FIG. 2. This makes it possible to provide a terminate adjustment of the length of time that transpires between the time that the edge strip material leaves the cement container and the time that it passes over guide roller 28 to insure that the cement is dried to just the proper degree of tackiness before it is applied to the belt carcass edge. A guide 71, as seen in FIG. 2, set by an adjusting screw device 72 assists in directing the edge strip material and insuring that it properly meets the edge of the belt carcass.

With this apparatus no manual work is required and the edge strip can be perfectly applied whether the belt runs continuously or intermittently because the belt drags the edge strip material with it as it is applied.

The cement conditions can be terminately adjusted and all the operator need do is to supply cement and spools of edge strip material as required.

The embodiments of the invention in which an exclusive property or privilege is claimed are defined as follows:

1. Apparatus for continuously applying flexible strip material to the edges of a longitudinally moving flat conveyor belt, said apparatus comprising a support upon which the conveyor belt is supported as it is advanced longitudinally, a carriage positioned at each side of the conveyor belt, the carriages being mounted to move as a unit laterally of the longitudinal movement of the conveyor belt to accommodate lateral shifting of the conveyor belt on the said support while the conveyor belt is being advanced, means for supplying a length of flexible edge strip material to each edge of the conveyor belt, and means included in each of said carriages for pressing the lengths of edge strip material against the conveyor belt edges.

2. Apparatus for continuously applying flexible strip material to the edges of a longitudinally moving flat conveyor belt, said apparatus comprising a support upon which the conveyor belt is supported as it is advanced longitudinally, a carriage positioned at each side of the conveyor belt, the carriages being mounted to move as a unit laterally of the longitudinal movement of the conveyor belt to accommodate lateral shifting of the conveyor belt on the said support while the conveyor belt is being advanced, means for supplying a length of flexible edge strip material to each edge of the conveyor belt, and a belt-edge presser roller mounted on each of said carriages for pressing the lengths of edge strip material against the conveyor belt edges.

3. Apparatus for continuously applying flexible strip material to the edges of a longitudinally moving flat conveyor belt carcass, said apparatus comprising a support upon which the conveyor belt is supported as it is advanced longitudinally, a carriage positioned at each side of the conveyor belt, the carriages being mounted to move as a unit laterally of the longitudinal movement of the conveyor belt to accommodate lateral shifting of the conveyor belt on the said support while the conveyor belt is being advanced, a belt-edge presser roller mounted on each of said carriages, means for suppling a length of flexible edge strip material to each edge of the conveyor belt, said edge strip material supplying means including means for passing the edge strip material between the edges of the conveyor belt carcass and said presser rollers mounted on said carriages, and resilient means urging said carriages toward one another whereby said presser rollers mounted on said carriages press the lengths of edge strip material against the edges of the conveyor belt.

4. Apparatus for continuously applying flexible strip material to the edges of a longitudinally moving flat conveyor belt carcass, said apparatus comprising a support upon which the conveyor belt is supported as it is advanced longitudinally, a guide rail extending across said support and transverse to the direction of longitudinal advance of the conveyor belt, a carriage positioned on each side of the conveyor belt and slidably mounted on the said guide rail, the carriages being mounted to travel as a unit along said guide rail to accommodate lateral shifting of the conveyor belt on the said support while the conveyor belt is being advanced, a belt-edge presser roller mounted on each of said carriages, means for supplying a length of flexible edge strip material to each edge of the conveyor belt, said edge strip material supplying means including means for passing the edge strip material between the edges of the conveyor belt carcass and said presser rollers mounted on said carriages, and resilient means urging said carriages toward one another whereby said presser rollers mounted on said carriages press the lengths of edge strip material against the edges of the conveyor belt.

5. Apparatus for continuously applying flexible strip material to the edges of a longitudinally moving flat conveyor belt carcass, said apparatus comprising a support upon which the conveyor belt is supported as it is advanced longitudinally, a guide rail extending across said support and transverse to the direction of longitudinal advance of the conveyor belt, a carriage positioned on each side of the conveyor belt and slidably mounted on said guide rail, tie means cross-connecting said carriages so that said carriages travel as a unit along said guide rail to accommodate lateral shifting of the conveyor belt on said support while the conveyor belt is being advanced, a belt-edge presser roller mounted on each of said carriages, means for supplying a length of flexible edge strip material to each edge of the conveyor belt, said edge strip material supplying means including means for passing the edge strip material between the edges of the conveyor belt carcass and said presser rollers mounted on said carriages, said tie means including means for resiliently urging said carriages toward one another whereby said presser rollers mounted on said carriages press the lengths of edge strip material against the edges of the conveyor belt.

(References on following page)

References Cited in the file of this patent

UNITED STATES PATENTS

| | | |
|---|---|---|
| 1,558,383 | Mathes | Oct. 20, 1925 |
| 2,220,613 | Parkes et al. | Nov. 5, 1940 |
| 2,262,638 | Ferm | Nov. 11, 1941 |
| 2,387,036 | Morse | Oct. 16, 1945 |
| 2,528,754 | Johnson | Nov. 7, 1950 |
| 2,529,859 | Ambler et al. | Nov. 14, 1950 |
| 2,579,822 | Homeier et al. | Dec. 25, 1951 |
| 2,641,416 | McCleary et al. | June 9, 1953 |
| 2,696,865 | Seiler | Dec. 14, 1954 |
| 2,749,966 | Roetger | June 12, 1956 |
| 2,757,709 | Crabbe et al. | Aug. 7, 1956 |

FOREIGN PATENTS

| | | |
|---|---|---|
| 213,978 | Australia | Mar. 18, 1958 |
| 474,415 | Canada | June 12, 1951 |